United States Patent
Su

(10) Patent No.: US 8,830,290 B2
(45) Date of Patent: Sep. 9, 2014

(54) VIDEO CONFERENCE APPARATUS AND METHOD FOR AUDIO-VIDEO SYNCHRONIZATION

(71) Applicant: Chi-Chung Su, New Taipei (TW)

(72) Inventor: Chi-Chung Su, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 116 days.

(21) Appl. No.: 13/629,647

(22) Filed: Sep. 28, 2012

(65) Prior Publication Data

US 2013/0342632 A1     Dec. 26, 2013

(30) Foreign Application Priority Data

Jun. 25, 2012  (TW) .............................. 101122696 A

(51) Int. Cl.
*H04N 7/14* (2006.01)
*H04N 7/12* (2006.01)
*H04N 11/04* (2006.01)
*H04N 9/475* (2006.01)

(52) U.S. Cl.
USPC .................. 348/14.01; 348/14.08; 348/423.1; 348/515

(58) Field of Classification Search
CPC . H04N 21/4305; H04N 21/4307; H04N 5/04; H04N 7/147; H04L 7/0083; H04L 7/0016; H04L 7/0087
USPC ............ 348/14.01, 14.07, 14.08, 14.09, 14.1, 348/14.12, 423.1, 500, 513, 515, E07.077, 348/E07.078; 370/260, 270
See application file for complete search history.

(56) References Cited

U.S. PATENT DOCUMENTS

| | | | | |
|---|---|---|---|---|
| 5,430,485 A | * | 7/1995 | Lankford et al. | 348/423.1 |
| 6,125,398 A | * | 9/2000 | Mirashrafi et al. | 709/236 |
| 6,181,383 B1 | * | 1/2001 | Fox et al. | 348/515 |
| 6,583,821 B1 | * | 6/2003 | Durand | 348/515 |
| 7,664,057 B1 | * | 2/2010 | Wu et al. | 370/260 |
| 8,179,476 B2 | * | 5/2012 | Plaunt | 348/515 |
| 8,526,777 B2 | * | 9/2013 | Yoshimura | 386/212 |
| 2005/0259694 A1 | * | 11/2005 | Garudadri et al. | 370/503 |
| 2007/0247550 A1 | * | 10/2007 | Plaunt | 348/515 |
| 2012/0098923 A1 | * | 4/2012 | Westin | 348/14.08 |

* cited by examiner

*Primary Examiner* — Binh Tieu
(74) *Attorney, Agent, or Firm* — Novak Druce Connolly Bove + Quigg LLP

(57) ABSTRACT

An audio-video synchronization method is executable in a video conference device. The method includes determining a first presence time of a predetermined visual effect in a captured video sample stream and a second presence time of a predetermined sound effect in a captured audio sample stream, calculating a time difference between the first and second presence time, and adjusting timestamps of each real-time transport protocol packet in an audio stream sent out by the video conference apparatus based on the time difference. The method further includes receiving an adjustment value from an user input, and adjusting timestamps of each real-time transport protocol packet in an audio stream received by the video conference apparatus based on the adjustment value.

11 Claims, 3 Drawing Sheets

VIDEO CONFERENCE APPARATUS AND METHOD FOR AUDIO-VIDEO SYNCHRONIZATION

BACKGROUND

1. Technical Field

Embodiments of the present disclosure relate to a video conference apparatus and a method for audio-video synchronization for the video conference apparatus.

2. Description of Related Art

In a video conference, audio and video captured at a senders endpoint at the same time must be simultaneously and synchronously played at a receivers endpoint in order to achieve audio-video synchronization, which is also called lip sync.

Current synchronization method for real-time transport protocol (RTP)-based video conference relies upon timestamps information assigned at the sender endpoint, and the receiver endpoint plays audio and video streams based on timestamps information. However, such synchronization method may be limited by a capability of a processor, or uncertainty in latencies through hardware components of the sender endpoint or the receiver endpoint, and causes timestamps information not to be processed as expected.

Therefore, a audio-video synchronization method capable of overcoming the aforementioned deficiencies and inadequacies is needed.

DETAILED DESCRIPTION

Figure 1:
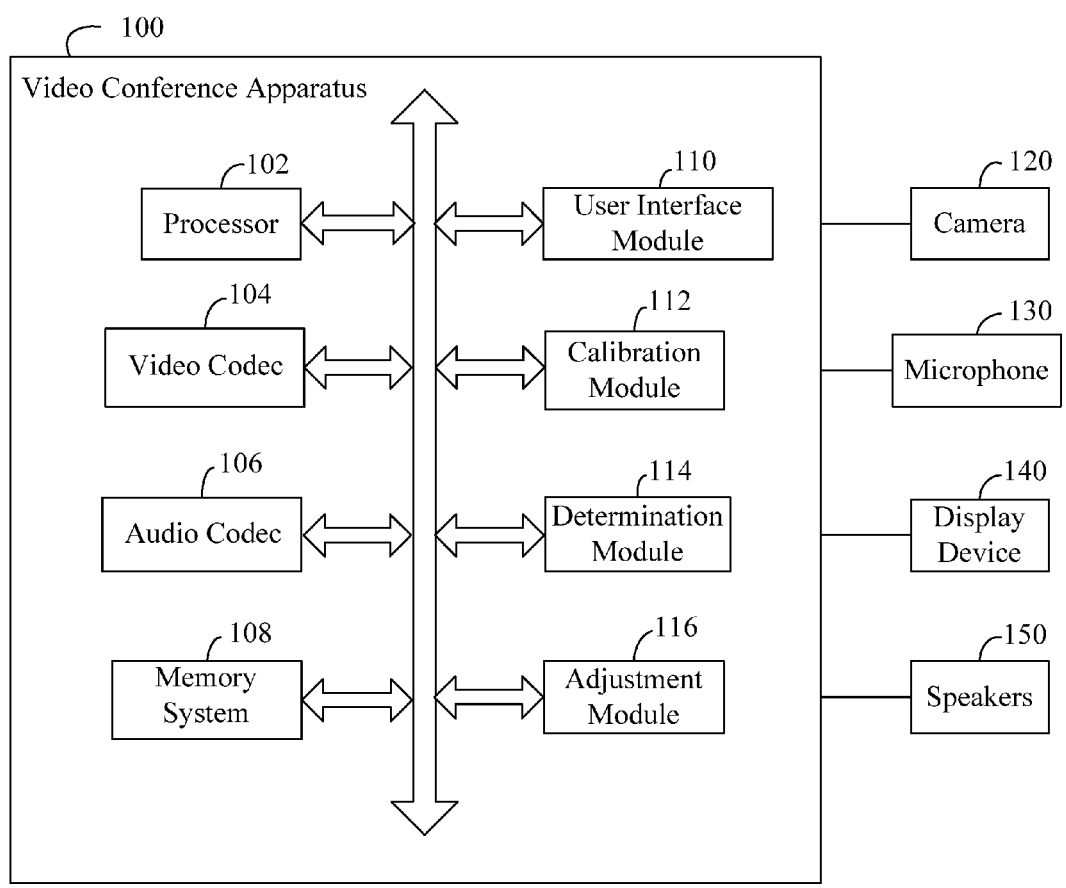
FIG. 1 is a block diagram of one embodiment of a video conference apparatus, in accordance with the present disclosure.

FIG. 1 is a block diagram of one embodiment of a video conference apparatus 100. In one embodiment of operation, users of the video conference apparatus 100 can engage in a video conference with each other. The video conference apparatus 100 includes a processor 102, a video codec 104, an audio codec 106, a memory system 108, a user interface module 110, a calibration module 112, a determination module 114, and an adjustment module 116.

In general, the word "module" as used herein, refers to logic embodied in hardware or firmware, or a collection of software instructions, written in a program language. In one embodiment, the program language may be Java, or C, or an assembly language. The modules 110-116 described herein may be implemented as either a software and/or hardware module(s) and may be stored in the memory system 108.

One or more software instructions of the modules 110-116 may be executed by the processor 102. The processor 102 can include a general-purpose processor, a specialized processor, a microprocessor, or similar component that executes software instructions. In one embodiment, the processor 102 operates under control of logic embodied in firmware stored in the memory system 108.

The video codec 104 encodes and decodes video data, and the audio codec 106 encodes and decodes audio data to be transmitted to and received from network. The memory system 108 includes volatile and nonvolatile memory system, and removable and non-removable media implemented in any method or technology for storage of information such as computer-readable instructions, data structures, program modules or other data.

To enable a video conference, the video conference apparatus 100 is in communication with capture devices such as a camera 120 and a microphone 130, and playback devices such as a display device 140 and speakers 150. The user at the video conference apparatus 100 can view and hear the other user via the display device 140 and the speakers 150. Likewise, the other user can receive video and audio data captured by the camera 120 and the microphone 130, thus establishing a full video conference environment. In one embodiment, the capture devices and the playback devices can be incorporated into the video conference apparatus 100.

The video conference apparatus 100 can be used as the sender endpoint or the receiver endpoint in the video conference. When the video conference apparatus 100 is used as the receiver endpoint, in one embodiment, the display device 140 can include the speakers 150, such as a television. In one embodiment, the display device 140 and the speakers 150 can be two separate and independent devices. After receiving a video stream and an audio stream, the video conference apparatus 100 decodes the video stream and the audio stream by the video codec 104 and audio codec 106, and sends the video stream and the audio stream to the display device 140 and the speakers 150 to playback. As a result, delays at the receiver endpoint may be caused by decoding delays on the video codec 104 and the audio codec 106, and playback delays on the display device 140 and the speakers 150.

To achieve audio-video synchronization, the video conference apparatus 100 provides a timestamp adjustment function for a user when the video conference apparatus 100 operates as the receiver endpoint. As shown in FIG. 1, the user interface module 110 provides a user interface for an user to configure settings of a video conference and adjust timestamps of each RTP packets of the received audio stream. The timestamps adjustment interface allows increasing or decreasing values of timestamps in unit of milliseconds. The adjustment module 116 adjusts timestamps of each RTP packet of the received audio stream based on an adjustment value set by the user.

Figure 2:
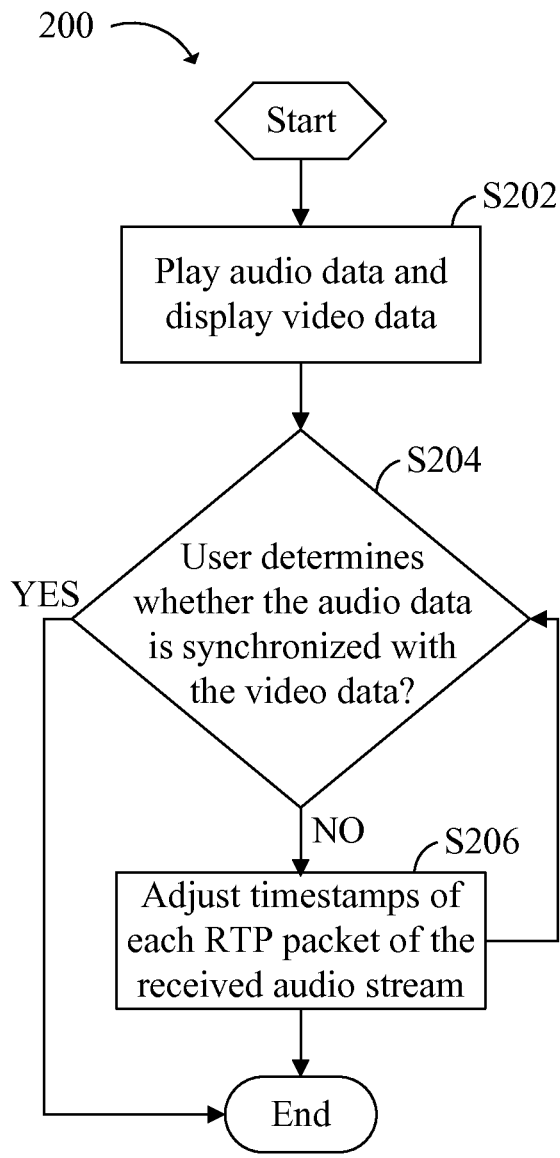
FIG. 2 is a flowchart of one embodiment of a method for audio-video synchronization of the video conference apparatus at a receiver endpoint in accordance with the present disclosure.

FIG. 2 is a flowchart 200 of one embodiment of a method for audio-video synchronization when the video conference apparatus 100 operates as the receiver endpoint. In step S202, the video conference apparatus 100 displays video data on the display device 140 and plays audio data on the speakers 150. In one embodiment, the display device 140 and the speakers 150 are two separate and independent devices. In another embodiment, the speakers 150 are incorporated into and controlled by the display device 140. In step S204, an user determines whether the video data displayed on the display device 140 is synchronized with the audio data played on the speakers 150. If the video data is synchronized with the audio data, the method of flowchart 200 ends. If the video data is not synchronized with the audio data, the method of flowchart 200 goes to step S206.

In step S206, the user inputs an adjustment value by the user interface module 110. The adjustment value is used to adjust the synchronization of video and audio streams by increasing or decreasing delay to the audio stream based on adjusted timestamps.

For example, the adjustment module 116 adjusts timestamps of each RTP packet of the received audio stream by adding the adjustment value input by the user. The adjustment value can be a positive value or a negative value. If the adjustment value is a positive value, the adjustment module 116 increases delay to the audio stream by adding the adjustment value to timestamps of each RTP packet of the received audio stream. If the adjustment value is a negative value, the adjustment module 116 decreases delay to the audio stream by adding the adjustment value to timestamps of each RTP packet of the received audio stream.

The procedure repeats step S204 and step S206 until the user determines the video data displayed on the display device 140 is synchronized with the audio data played on the speakers in step S204. In one embodiment, the final adjustment value input by the user is stored in the memory system 108, and the adjustment module 116 adjusts timestamps of each RTP packet of the received audio stream according to the stored adjustment value. In one embodiment, various adjustment values input by different users are stored in the memory system 108, and the adjustment module 116 adjusts timestamps of each RTP packet of the received audio stream based on an average of the stored adjustment values in order to compensate perception differences between different users.

When the video conference apparatus 100 is used as the sender endpoint, video data and audio data are captured by the camera 120 and the microphone 130. The video conference apparatus 100 encodes video and audio streams by the video codec 104 and the audio codec 106, and packetizes the encoded data as RTP packets for transport over a network. As a result, delays at the sender endpoint may be caused by capturing delays on the camera 120 and the microphone 130, encoding delays on the video codec 104 and the audio codec 106 and packetization delays.

To achieve audio-video synchronization, the video conference apparatus 100 provides an automatic calibration functionality when operating as the sender endpoint. As shown in FIG. 1, the user interface module 110 provides the user interface for the user to configure settings of a video conference and execute the automatic calibration functionality.

Before establishing the video conference, the user can initiate the video conference apparatus 100, the camera 120, the microphone 130, the display device 140, and the speakers 150, and execute the automatic calibration functionality through the user interface module 110. In one embodiment, the calibration module 112 is driven by the user interface module 110 to send video data to cause a predetermined visual effect displayed on the display device 140, and send audio data to cause a predetermined sound effect played on the speakers 150. The predetermined visual effect, different from a general visual effect of the video conference, can be a single bright flash, or a series of flashes of light. The predetermined sound effect, different from a general sound effect of the video conference, can be a beep, a single long beep, or a series of beeps. The predetermined visual effect and the predetermined sound effect are used later to determine whether video is leading or lagging audio, so must be played synchronously. The video conference apparatus 100 can perform the method shown in FIG. 2 controlled by the user before executing the automatic calibration functionality to ensure that synchronization can be achieved. In one embodiment, an external calibration device is used to synchronously play the predetermined visual effect and the predetermined sound effect to ensure that synchronization can be achieved. The external calibration device is electrically communicated with the video conference apparatus 100. The user can control the external calibration device by the user interface module 110 or by the physical user interface, such as a switch, a set of buttons, or a touch panel, deployed on a surface of the external calibration device.

The camera 120 and the microphone 130 then capture the predetermined visual effect and the predetermined sound effect. The captured predetermined visual effect and sound effect are respectively encoded by the video codec 104 and the audio codec 106 as a video and an audio sample streams, and the encoded video and audio sample streams are stored in the memory system 108.

The determination module 114 determines a first presence time of the predetermined visual effect in the stored video sample stream (e.g., 45 seconds) and a second presence time of the predetermined sound effect in the stored audio sample stream (e.g., 46 seconds), calculates a time difference between the first presence time and the second presence time, and stores the time difference in the memory system 108. The adjustment module 116 then adjusts timestamps of each RTP packet in an audio stream of a video conference based on the stored time difference before the video conference apparatus 100 sends out the audio stream.

Figure 3:
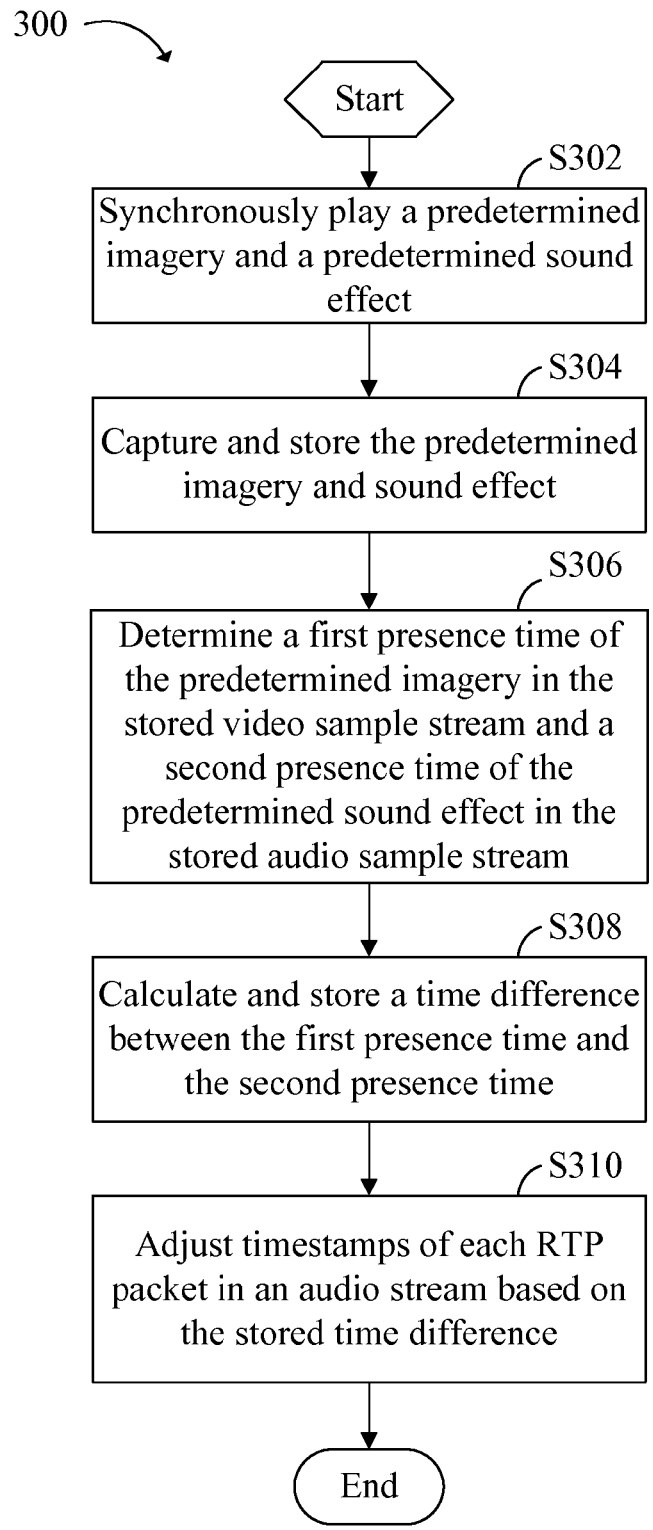
FIG. 3 is a flowchart of one embodiment of a method for audio-video synchronization of the video conference apparatus at a sender endpoint in accordance with the present disclosure.

FIG. 3 is a flowchart 300 of one embodiment of a method for audio-video synchronization when the video conference apparatus 100 operates as the sender endpoint. Before establishing the video conference, the user can initiate the video conference apparatus 100, the camera 120, the microphone 130, the display device 140, and the speakers 150, and execute the automatic calibration functionality through the user interface module 110. In step S302, the calibration module 112 is driven by the user interface module 110 to send video data to cause a predetermined visual effect displayed on the displayed device 140, and send audio data to cause a predetermined sound effect played on the speakers 150. The predetermined visual effect, different from a general visual effect of the video conference, can be a single bright flash, or a series of flashes. The predetermined sound effect, different from a general sound effect of the video conference, can be a beep, a single long beep, or a series of beeps. The predetermined visual effect and the predetermined sound effect are used later to determine whether video is leading or lagging audio. In one embodiment, the video conference apparatus 100 can perform the method shown in FIG. 2 controlled by the user before executing the automatic calibration functionality to ensure that synchronization can be achieved. In one embodiment, the external calibration device is used to synchronously play the predetermined visual effect and the predetermined sound effect to ensure that synchronization can be achieved. The external calibration device is electrically communicated with the video conference apparatus 100, and is used to replace the functionality of the calibration module 112. Thus, in step S302, the external calibration device is driven, other than the calibration module 112, by the user interface module 110, to play the predetermined visual effect and the synchronized predetermined sound effect. In another embodiment, the external calibration device is controlled by the user through the physical user interface deployed on the surface of the external calibration device other than through the user interface module 110. The physical user interface, for example, can be a switch, a set of buttons, or a touch panel.

In step S304, the synchronously played predetermined visual effect and sound effect are captured by the camera 120 and the microphone 130. The captured predetermined visual effect and sound effect are encoded by the video codec 104 and the audio codec 106 as a video and an audio sample streams, and the encoded video and audio sample streams are stored in the memory system 108.

In step S306, the determination module 114 determines the first presence time of the predetermined visual effect in the stored video sample stream and a second presence time of the predetermined sound effect in the stored audio sample stream. In step S308, the determination module calculates the time difference between the first presence time and the second presence time, and stores the time difference in the memory system 108.

In step S310, the adjustment module 116 adjusts timestamps of each RTP packet in an audio steam of the video conference based on the stored time difference before the video conference apparatus 100 sends out the audio stream. If the first presence time is ahead of the second presence time, which represents the audio stream is lagging, the adjustment module 116 subtracts the stored time difference from timestamps of each RTP packet in the audio stream. Otherwise, if the first presence time is behind the second presence time, which represents the audio stream is leading, the adjustment module 16 adds the stored time difference to timestamps of each RTP packet in the audio stream.

In summary, the above-described audio-video synchronization methods accurately facilitate lip sync whether the video conference apparatus 100 is used as the receiver endpoint or the sender point even if various delay exists along a end-to-end path.

The foregoing disclosure of various embodiments has been presented for purposes of illustration and description. It is not intended to be exhaustive or to limit the disclosure to the precise forms disclosed. Many variations and modifications of the embodiments described herein will be apparent to one of ordinary skill in the art in light of the above disclosure. The scope of the disclosure is not limited to the claims appended hereto and their equivalents.

What is claimed is:

1. An audio-video synchronization method of a video conference apparatus, wherein the video conference apparatus comprises a memory system, a camera and a microphone which are in communication with the video conference apparatus, the method comprising:
    capturing a predetermined visual effect and a synchronized predetermined sound effect by the camera and the microphone, respectively;
    encoding a video sample stream and an audio sample stream, wherein the video sample stream comprises the predetermined visual effect and the audio sample stream comprises the predetermined sound effect;
    storing the video sample stream and the audio sample stream in the memory system;
    determining a first presence time of the predetermined visual effect in the stored video stream;
    determining a second presence time of the predetermined sound effect in the stored audio stream;
    calculating a time difference between the first presence time and the second presence time;
    storing the time difference in the memory system; and
    subtracting the stored time difference from timestamps of each real-time transport protocol packet in an audio stream of by the video conference apparatus if the first presence time is ahead of the second presence time; and
    adding the stored time difference to timestamps of each real-time transport protocol packet in the audio stream of the video conference apparatus if the first presence time is behind the second presence time.

2. The method of claim 1, wherein the predetermined visual effect is one of a single flash of light, and a series of flashes of light.

3. The method of claim 1, wherein the predetermined sound effect is one of a beep, a single long beep, and a series of beeps.

4. An audio-video synchronization method of a video conference apparatus operable to receive an audio stream of a video conference, wherein the video conference apparatus comprises a memory system, the method comprising:
    receiving adjustment values;
    storing the adjustment values in the memory system;
    calculating an average of the stored adjustment values;
    storing the average in the memory system; and
    adjusting timestamps of each real-time transport protocol packet in the received audio stream by adding the stored average to timestamps of each RTP packet of the received audio stream.

5. The method of claim 4, wherein the adjustment values are in a unit of millisecond.

6. The method of claim 5, wherein the each of the adjustment values is one of a positive value and a negative value.

7. A video conference apparatus operable to receive an audio stream of a video conference, the video conference apparatus comprising:
    a camera capturing a predetermined visual effect;
    a microphone capturing a predetermined sound effect synchronized with the predetermined visual effect;
    a memory system storing a video sample stream comprising the predetermined visual effect and an audio sample stream comprising the predetermined sound effect which are encoded by the video conference apparatus;
    a determination module determining a first presence time of the predetermined visual effect of the video sample stream and a second presence time of the predetermined sound effect of the audio sample stream, calculating a time difference between the first presence time and the second presence time, and storing the time difference in the memory system;
    an user interface module receiving adjustment values, and storing the adjustment values in the memory system; and
    an adjustment module subtracting the stored time difference from timestamps of each real-time transport protocol packet in an audio stream of the video conference apparatus is the first presence time is ahead of the second presence time, and adding the stored time difference to timestamps of each real-time transport protocol packet in the audio stream if the first presence time is behind the second presence time; and calculating an average of the stored adjustment values, storing the average in the memory system, and adjusting timestamps of each real-time transport protocol by adding the stored average to timestamps of each real-time transport protocol packet of the received audio stream.

8. The video conference apparatus of claim 7, wherein the predetermined visual effect is one of a single flash of light, and a series of flashes of light.

9. The video conference apparatus of claim 7, wherein the predetermined sound effect is one of a beep, a single long beep, and a series of beeps.

10. The video conference apparatus of claim 7, wherein each of the adjustment values is in a unit of millisecond.

11. The video conference apparatus of claim 10, wherein each of the adjustment value is a one of a positive value and a negative value.

* * * * *